US012639978B2

(12) United States Patent
Kang et al.

(10) Patent No.: US 12,639,978 B2
(45) Date of Patent: May 26, 2026

(54) FINGERPRINT FEATURE EXTRACTION DEVICE, STORAGE MEDIUM STORING INSTRUCTIONS TO PERFORM FINGERPRINT FEATURE EXTRACTION METHOD, AND METHOD FOR TRAINING NEURAL NETWORK TO EXTRACT FEATURE INFORMATION OF FINGERPRINT

(71) Applicant: Suprema Inc., Seongnam-si (KR)

(72) Inventors: Young Mook Kang, Seongnam-si (KR); Bong Seop Song, Seongnam-si (KR); Hochul Shin, Seongnam-si (KR); Jae Hyun Park, Seongnam-si (KR); Jong Man Lee, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 47 days.

(21) Appl. No.: 18/617,859

(22) Filed: Mar. 27, 2024

(65) Prior Publication Data

US 2025/0182523 A1     Jun. 5, 2025

(30) Foreign Application Priority Data

Dec. 5, 2023     (KR) ......................... 10-2023-0174878

(51) Int. Cl.
*G06V 40/12*         (2022.01)
*G06V 10/82*         (2022.01)
*G06V 40/50*         (2022.01)

(52) U.S. Cl.
CPC .......... *G06V 40/1353* (2022.01); *G06V 10/82* (2022.01); *G06V 40/1359* (2022.01);
(Continued)

(58) Field of Classification Search
CPC .............. G06V 40/1353; G06V 10/82; G06V 40/1359; G06V 40/1371; G06V 40/1376;
(Continued)

(56) References Cited

U.S. PATENT DOCUMENTS

2018/0089494 A1     3/2018   Zhu et al.
2021/0397813 A1*   12/2021   Lee ...................... G06V 10/754

FOREIGN PATENT DOCUMENTS

KR      10-2021-0157951 A     12/2021

OTHER PUBLICATIONS

Examiner, "Office Action for KR Application No. 10-2023-0174878", Jan. 6, 2026, KIPO, Republic of Korea.

* cited by examiner

*Primary Examiner* — Abhishek Sarma
(74) *Attorney, Agent, or Firm* — Bridgeway IP Law Group, PLLC; Jihun Kim

(57)     ABSTRACT

There is provided a fingerprint feature extraction device including a fingerprint contact surface. The device comprises a fingerprint input sensor configured to detect a fingerprint of a target in contact with the fingerprint contact surface; a memory configured to store instructions for outputting a fingerprint feature extraction result with respect to the fingerprint input from the fingerprint input sensor using a pre-trained neural network; and a processor configured to execute the instructions, wherein the instructions, when executed by the processor, cause the processor to modify feature information of a fingerprint registered in the fingerprint feature extraction device on the basis of feature information of the input fingerprint of the target, pair the modified feature information of the registered fingerprint with the
(Continued)

MATCHING IS SUCCESSFUL     STORE

REGISTERED
FINGERPRINT

INPUT
FINGERPRINT a

INPUT
FINGERPRINT a

MATCHING

FEATURE
INFORMATION
OF REGISTERED
FINGERPRINT

FEATURE
INFORMATION
OF INPUT
FINGERPRINT a

MODIFIED
FEATURE
INFORMATION OF
REGISTERED
FINGERPRINT feature information of the input fingerprint, and input results of pairing to the neural network to output the fingerprint feature extraction result.

15 Claims, 8 Drawing Sheets

(52) U.S. Cl.
CPC ...... *G06V 40/1371* (2022.01); *G06V 40/1376* (2022.01); *G06V 40/50* (2022.01)
(58) Field of Classification Search
CPC .............. G06V 40/50; G06V 40/1365; G06V 40/1347; G06V 10/242; G06V 10/761; G06V 10/772; G06V 10/774
See application file for complete search history.

FIG.7

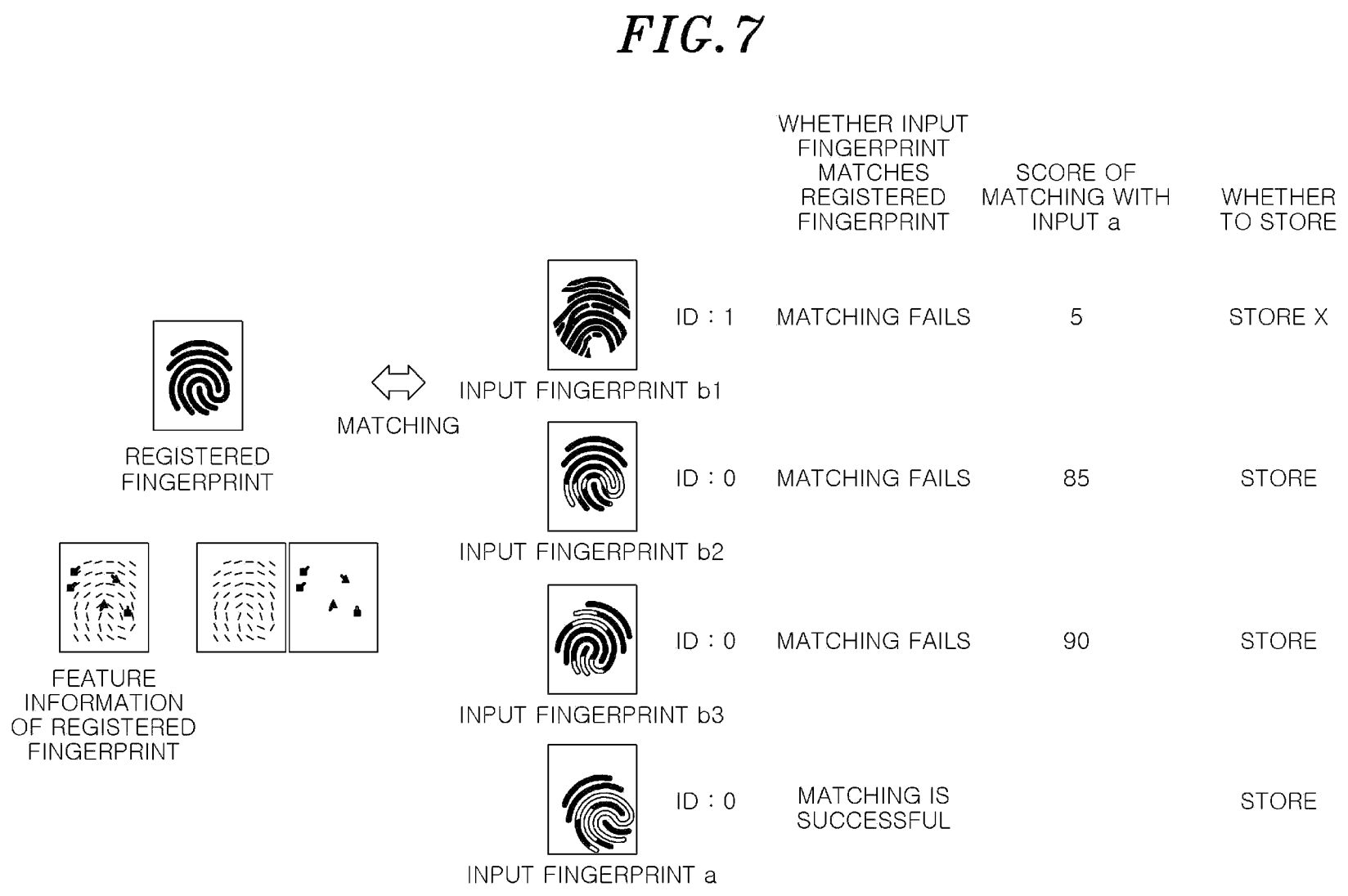

| | WHETHER INPUT FINGERPRINT MATCHES REGISTERED FINGERPRINT | SCORE OF MATCHING WITH INPUT a | WHETHER TO STORE |
|---|---|---|---|
| ID : 1 INPUT FINGERPRINT b1 | MATCHING FAILS | 5 | STORE X |
| ID : 0 INPUT FINGERPRINT b2 | MATCHING FAILS | 85 | STORE |
| ID : 0 INPUT FINGERPRINT b3 | MATCHING FAILS | 90 | STORE |
| ID : 0 INPUT FINGERPRINT a | MATCHING IS SUCCESSFUL | | STORE |

136

136

FINGERPRINT FEATURE EXTRACTION DEVICE, STORAGE MEDIUM STORING INSTRUCTIONS TO PERFORM FINGERPRINT FEATURE EXTRACTION METHOD, AND METHOD FOR TRAINING NEURAL NETWORK TO EXTRACT FEATURE INFORMATION OF FINGERPRINT

CROSS-REFERENCE TO RELATED APPLICATIONS

This application claims the priority of Korean Patent Application No. 10-2023-0174878 filed on Dec. 5, 2023, in the Korean Intellectual Property Office, the disclosure of which is incorporated herein by reference.

TECHNICAL FIELD

The present disclosure relates to technology for extracting fingerprints, and in particular, to technology for extracting features of fingerprints using a neural network and performing access control using the fingerprint features.

This work was supported by Institute of Information & communications Technology Planning & Evaluation (IITP) grant funded by Korea government (MSIT) (Project unique No.: 2020-0-01787; and Research Project Title: Development of Converged Innovative Technologies for Superintelligent Services in Communication/Computing).

BACKGROUND

Fingerprint recognition algorithms using existing neural networks are learned through offline learning for training a model based on all collected data. This has the disadvantage that, when new data is collected and additional learning on existing data is required, the entire model needs to be retrained using the new data along with previous data.

In addition, online learning of continuously training a model while receiving data in real time is not suitable for gradually improving the performance of a fingerprint recognition algorithm in a device (terminal or the like). This is because if data obtained in real time is damaged or useless, parameters of a task performance model may be updated in a direction in which the performance is deteriorated, thereby gradually reducing system performance. Additionally, online learning requires continuous monitoring of the system and stopping learning immediately when performance deterioration is detected, which consumes a lot of time and resources.

Therefore, fingerprint recognition technology capable of gradually improving performance while minimizing resource consumption is required.

The above-mentioned background technology is technical information that the inventor possessed for deriving the present disclosure or acquired in the process of deriving the present disclosure and cannot necessarily be said to be known technology disclosed to the general public before the application for the present disclosure.

SUMMARY

An embodiment of the present disclosure provides a fingerprint recognition technology capable of gradually improving performance while minimizing resource consumption by continuously reflecting newly input fingerprint features in an existing registered fingerprint.

An embodiment of the present disclosure provides a fingerprint recognition technology capable of gradually improving the performance of a fingerprint recognition algorithm by providing continuity for data learning of a neural network for fingerprint feature extraction.

The aspects of the present disclosure are not limited to the foregoing, and other aspects not mentioned herein will be clearly understood by those skilled in the art from the following description.

In accordance with an aspect of the present disclosure, there is provided a fingerprint feature extraction device including a fingerprint contact surface, the device comprises: a fingerprint input sensor configured to detect a fingerprint of a target in contact with the fingerprint contact surface; a memory configured to store one or more instructions for outputting a fingerprint feature extraction result with respect to the fingerprint input from the fingerprint input sensor using a pre-trained neural network; and a processor configured to execute the one or more instructions stored in the memory, wherein the instructions, when executed by the processor, cause the processor to modify feature information of a fingerprint registered in the fingerprint feature extraction device on the basis of feature information of the input fingerprint of the target, pair the modified feature information of the registered fingerprint with the feature information of the input fingerprint, and input results of pairing to the neural network to output the fingerprint feature extraction result.

The processor may be configured to: extract feature information each from the input fingerprint and the registered fingerprint; compare the feature information of the input fingerprint with the feature information of the registered fingerprint and calculate a similarity between the feature information of the input fingerprint with the feature information of the registered fingerprint; determine whether the similarity exceeds a first threshold; and generate modification information to match corresponded minutiae between the feature information of the input fingerprint and the feature information of the registered fingerprint based on whether the similarity exceeds the first threshold.

The processor may be configured to store the input fingerprint if the similarity exceeds the first threshold and modifies the feature information of the registered fingerprint based on the modification information.

The neural network may be configured to train the neural network to output the fingerprint feature extraction result by using the results of pairing as training input data and the modified feature information as training label data.

The storage includes: a fingerprint database configured to store image information of the input fingerprint and feature information of the input fingerprint; and a training database configured to store the results of pairing.

The processor may be configured to: compare the feature information of the input fingerprint with the feature information of the registered fingerprint and calculate a similarity between the feature information of the input fingerprint with the feature information of the registered fingerprint; determine whether the similarity according to the comparison exceeds a first threshold; store the input fingerprint if the similarity exceeds the first threshold; generate modification information to match corresponded minutiae between the feature information of the input fingerprint and the feature information of the registered fingerprint; and modify the feature information of the registered fingerprint on the basis of the modification information.

The processor may be configured to process at least one operation of rotation, movement, or distortion of minutiae of the registered fingerprint.

The processor is configured to: store the input fingerprint as a non-matching fingerprint if the similarity according to the comparison is below the first threshold; re-compare the feature information of the non-matching fingerprint with the feature information of the registered fingerprint and calculate a similarity according to the re-comparison between the feature information; determine whether the similarity according to the re-comparison exceeds a second threshold; generate additional modification information to match corresponded minutiae between the feature information of the non-matching fingerprint and the feature information of the registered fingerprint if the similarity according to the re-comparison exceeds the second threshold; re-modify the feature information of the registered fingerprint based on the additional modification information and the modification information; pair the re-modified feature information of the registered fingerprint with the feature information of the non-matching fingerprint; and input results of pairing to the neural network to output the fingerprint feature extraction result.

The processor may be configured to train the neural network to output the fingerprint feature extraction result by using the results of pairing as training input data and the re-modified feature information of the registered fingerprint as training label data.

In accordance with another aspect of the present disclosure, there is provided a non-transitory computer-readable recording medium storing a computer program, which comprises instructions for a processor to perform a fingerprint feature extraction method, the method comprise: preparing a pre-trained neural network; detecting a fingerprint of a target input on a fingerprint contact surface included in a fingerprint feature extraction device; modifying feature information of a fingerprint registered in the fingerprint feature extraction device based on the feature information of the input fingerprint of the target; pairing the modified feature information of the registered fingerprint with the feature information of the input fingerprint; and inputting results of pairing to the pre-trained neural network to output a fingerprint feature extraction result.

The method further comprises training the neural network to output the fingerprint feature extraction result by using the results of pairing as training input data and the modified feature information as training label data.

The modifying may include comparing the feature information of the input fingerprint with the feature information of the registered fingerprint and calculating a similarity between the feature information of the input fingerprint with the feature information of the registered fingerprint; determining whether the similarity exceeds a first threshold; storing the input fingerprint if the similarity exceeds the first threshold; generating modification information to match corresponded minutiae between the feature information of the input fingerprint and the feature information of the registered fingerprint; and modifying the feature information of the registered fingerprint based on the modification information.

The modifying may include processing at least one operation of rotation, movement, or distortion of the minutiae of the registered fingerprint.

The modifying may include storing the input fingerprint as a non-matching fingerprint if the similarity according to the comparison is below the first threshold; re-comparing the feature information of the non-matching fingerprint with the feature information of the registered fingerprint and calculating a similarity according to the re-comparison between the feature information; determining whether the similarity according to the re-comparison exceeds a second threshold; generating additional modification information to match corresponded minutiae between the feature information of the non-matching fingerprint and the feature information of the registered fingerprint if the similarity according to the re-comparison exceeds the second threshold; re-modifying the feature information of the registered fingerprint on the basis of the additional modification information and the modification information; pairing the re-modified feature information of the registered fingerprint with the feature information of the non-matching fingerprint; and inputting results of pairing to the pre-trained neural network to output the fingerprint feature extraction result.

The method further comprises training the neural network to output the fingerprint feature extraction result by using the results of pairing as training input data and using the re-modified feature information of the registered fingerprint as training label data.

In accordance with another aspect of the present disclosure, there is provided a method of training a neural network for fingerprint feature extraction using a fingerprint feature extraction device, the method comprises: modifying feature information of a fingerprint registered in the fingerprint feature extraction device on the basis of feature information of a fingerprint of a target input to the fingerprint feature extraction device; pairing modified feature information of the registered fingerprint with the feature information of the input fingerprint; and training the neural network to output a fingerprint feature extraction result with respect to the fingerprint by using results of pairing as training input data and the modified feature information as training label data.

The modifying may include comparing the feature information of the input fingerprint with the feature information of the registered fingerprint, and calculating a similarity between the feature information of the input fingerprint with the feature information of the registered fingerprint; determining whether the similarity exceeds a first threshold; storing the input fingerprint if the similarity exceeds the first threshold; generating modification information to match corresponded minutiae between the feature information of the input fingerprint and the feature information of the registered fingerprint; and modifying the feature information of the registered fingerprint on the basis of the modification information.

The modifying includes processing at least one operation of rotation, movement, or distortion of the minutiae of the registered fingerprint.

The method further comprises storing the input fingerprint as a non-matching fingerprint if the similarity is below the first threshold; re-comparing the feature information of the non-matching fingerprint with the feature information of the registered fingerprint and calculating a similarity according to the re-comparison between the feature information of the non-matching fingerprint with the feature information of the registered fingerprint; determining whether the similarity according to the re-comparison exceeds a second threshold; generating additional modification information to match corresponded minutiae between the feature information of the non-matching fingerprint and the feature information of the registered fingerprint if the similarity according to the re-comparison exceeds the second threshold; re-modifying the feature information of the registered fingerprint on the basis of the additional modification information and the modification information; pairing the re-modified feature information of the registered fingerprint with the feature information of the non-matching fingerprint; and training the neural network to output the fingerprint feature extraction result with respect to the input fingerprint by using results of pairing as training input data and the re-modified feature information of the registered fingerprint as training label data.

According to embodiments of the present disclosure, it is possible to gradually improve performance while minimizing resource consumption by continuously reflecting newly input fingerprint features in an existing registered fingerprint. Additionally, according to embodiments of the present disclosure, it is possible to gradually improve the performance of a fingerprint recognition algorithm by providing continuity for data learning of a neural network for fingerprint feature extraction. Accordingly, the present disclosure can reliably extract original fingerprint features even if a fingerprint state after registration is changed (damaged, missing, or the like).

BRIEF DESCRIPTION OF THE DRAWINGS

FIG. 7 and FIG. 8 are diagrams illustrating a fingerprint feature extraction method according to an embodiment of the present disclosure and are conceptual diagrams of another embodiment of storing information on modified features of a registered fingerprint.

DETAILED DESCRIPTION

Figure 1:
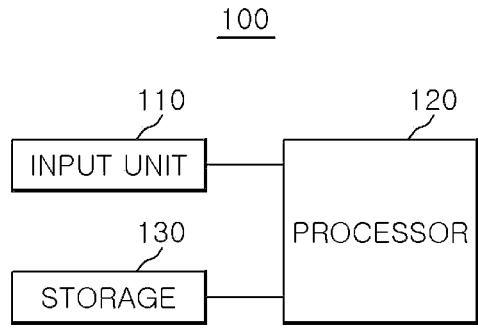
FIG. 1 is a block diagram illustrating functions of a fingerprint feature extraction device according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Conventional fingerprint recognition technology underutilizes collected data required to train a neural network, and system performance tends to gradually deteriorate due to data corruption therein.

Accordingly, an embodiment of the present disclosure proposes a fingerprint recognition technology capable of achieving performance improvement while minimizing resource consumption even if data is damaged by continuously reflecting newly input fingerprint features in an existing registered fingerprint and gradually improving the performance of a fingerprint recognition algorithm by providing continuity for data learning of a neural network for fingerprint feature extraction.

Hereinafter, embodiments of the present disclosure will be described in detail with reference to the attached drawings.

FIG. 1 is a block diagram illustrating functions of a fingerprint feature extraction device 100 according to an embodiment of the present disclosure.

As shown in FIG. 1, the fingerprint feature extraction device 100 may include an input unit 110, a processor 120, and a storage 130. In an embodiment of the present disclosure, the fingerprint feature extraction device 100 may include, for example, a fingerprint recognition terminal of an access control system.

When the fingerprint of a fingerprint contact target (e.g., a human finger) touches a fingerprint contact surface of the fingerprint feature extraction device 100, the input unit 110 may receive a fingerprint image acquired and processed in the fingerprint feature extraction device 100. The input unit 110 may include, for example, an image sensor provided in a fingerprint recognition terminal of an access control system. The image sensor can obtain an image of the fingerprint in contact with the fingerprint contact surface by outputting a digital signal, which is an electrical signal corresponding to an input optical signal. The image sensor is an optical fingerprint sensor, for example, and may use a charge coupled device (CCD) or a complementary metal-oxide semiconductor (CMOS) device and serve to detect a fingerprint shape image generated by a light source. However, the image sensor is not limited to specific devices. The image sensor according to an embodiment of the present disclosure generates an image by changing an electrical signal value depending on the amount of light, and may output a black image when there is no light and output a white image when the amount of incident light is maximized.

The processor 120 may extract feature information from the fingerprint image input through the input unit 110, modify feature information of a fingerprint registered in the fingerprint feature extraction device 100 on the basis of the extracted feature information, pair the modified feature information of the registered fingerprint with the fingerprint image, and input results of pairing to a neural network in the storage 130 such that the result is processed to output a fingerprint feature extraction result.

In addition, the processor 120 may primarily modify the feature information of the fingerprint registered in the fingerprint feature extraction device 100 depending on the first similarity obtained by comparing the feature information of the fingerprint input through the input unit 110 with the feature information of the registered fingerprint, secondarily modify the feature information of the registered fingerprint depending on the second similarity obtained by comparing feature information of an input fingerprint whose first similarity is less than a threshold with feature information of an input fingerprint whose first similarity is greater than the threshold, pair the feature information obtained by secondary modification with the input fingerprint whose first similarity is less than the threshold, and input results of pairing to the neural network such that the result is processed to output a fingerprint feature extraction result. This processor 120 may include, for example, a microprocessor-based processing device, and the specific configuration and functions of the processor 120 will be described in more detail with reference to FIG. 4 to FIG. 10 below.

The storage 130 may output a fingerprint feature extraction result on the basis of instructions of the processor 120 or may include a neural network pre-trained to output the fingerprint feature extraction result. Here, the neural network may include, for example, an artificial intelligence neural network based on deep learning and may be included in a fingerprint feature extraction program for fingerprint feature extraction of the processor 120. Therefore, the processor 120 may extract feature information from an input fingerprint image, pair the input image with modified feature information by executing instructions, and input results of pairing to the neural network in the storage 130 such that a fingerprint feature extraction result is output or to train the neural network to output the fingerprint feature extraction result. The storage 130 may include, for example, a recording medium such as a random access memory (RAM) or a read only memory (ROM) and does not need to be limited to a specific recording medium in implementing embodiments of the present disclosure.

Figure 2:
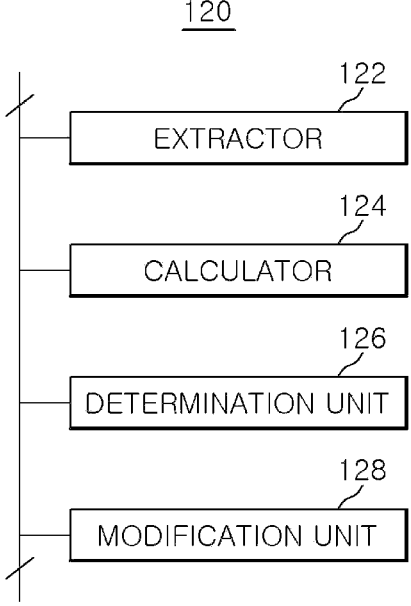
FIG. 2 is a block diagram illustrating specific functions of a processor of FIG. 1.

FIG. 2 is a block diagram illustrating specific functions of the processor 120 in the fingerprint feature extraction device 100 of FIG. 1.

As shown in FIG. 2, the processor 120 may include an extractor 122, a calculator 124, a determination unit 126, and a modification unit 128.

The extractor 122 can extract feature information from a fingerprint (including a fingerprint image) input through the input unit 110 and a fingerprint (including a fingerprint image) registered in the storage 130. Here, feature information includes minutiae of a fingerprint, and the minutiae can be extracted on the basis of ridges and valleys.

The calculator 124 can compare the feature information of the input fingerprint with the feature information of the registered fingerprint extracted through the extractor 22, and calculate a similarity therebetween on the basis of the comparison result. Here, the similarity may also be referred to as a matching rate.

The determination unit 126 may determine whether the similarity calculated by the calculator 124 exceeds a threshold. For example, the determination unit 126 may compare the similarity calculated by the calculator 124 with a threshold preset by a user and output the comparison result. Here, when the determination unit 126 determines that the similarity exceeds the threshold, the processor 120 may store the fingerprint input through the input unit 110 in the storage 130.

The modification unit 128 may generate modification information for matching minutiae between the feature information of the input fingerprint and the feature information of the registered fingerprint on the basis of the determination result of the determination unit 126, that is, the result of comparison between the similarity and the threshold. Here, the processor 120 may modify the feature information of the fingerprint registered in the storage 130 on the basis of the modification information generated by the modification unit 128.

Figure 3:
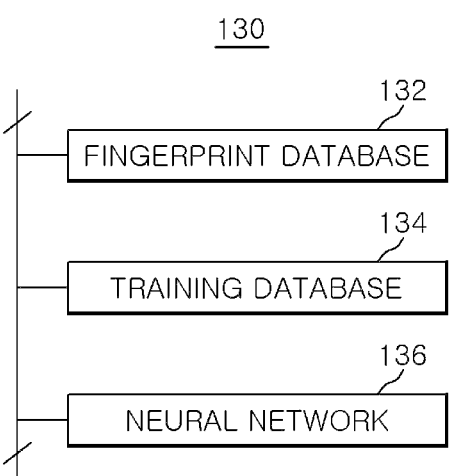
FIG. 3 is a block diagram illustrating specific functions of a storage of FIG. 1.

FIG. 3 is a block diagram illustrating specific functions of the storage 130 in the fingerprint feature extraction device 100 of FIG. 1.

As shown in FIG. 3, the storage 130 may include a fingerprint database 132, a learning database 134, and a neural network 136.

The fingerprint database 132 may store image information of fingerprints input through the input unit 110 and feature information of the fingerprints.

The learning database 134 may store information in which the modified feature information of the registered fingerprint processed by the processor 120 is paired with the fingerprint input through the input unit 110. This pairing information may be provided to the neural network 136 such that the neural network 136 is trained to extract fingerprint features or may be processed to output fingerprint features in response to fingerprint input.

In the fingerprint database 132 and the learning database 134, specific information may be recorded by the processor 120, and the specific information may be loaded on the basis of instructions of the processor 120 if necessary.

The neural network 136 may be a neural network trained to output a fingerprint feature extraction result by using results of pairing as training data and using the modified feature information of the registered fingerprint as training label data. When the neural network 136 is trained, if a random fingerprint image is input to the input unit 110, fingerprint features that are a result of learning through the trained neural network 136 can be extracted.

Hereinafter, along with the above-described configuration, a fingerprint feature extraction method according to an embodiment of the present disclosure will be described in detail with reference to FIG. 4 to FIG. 8.

Figure 4:
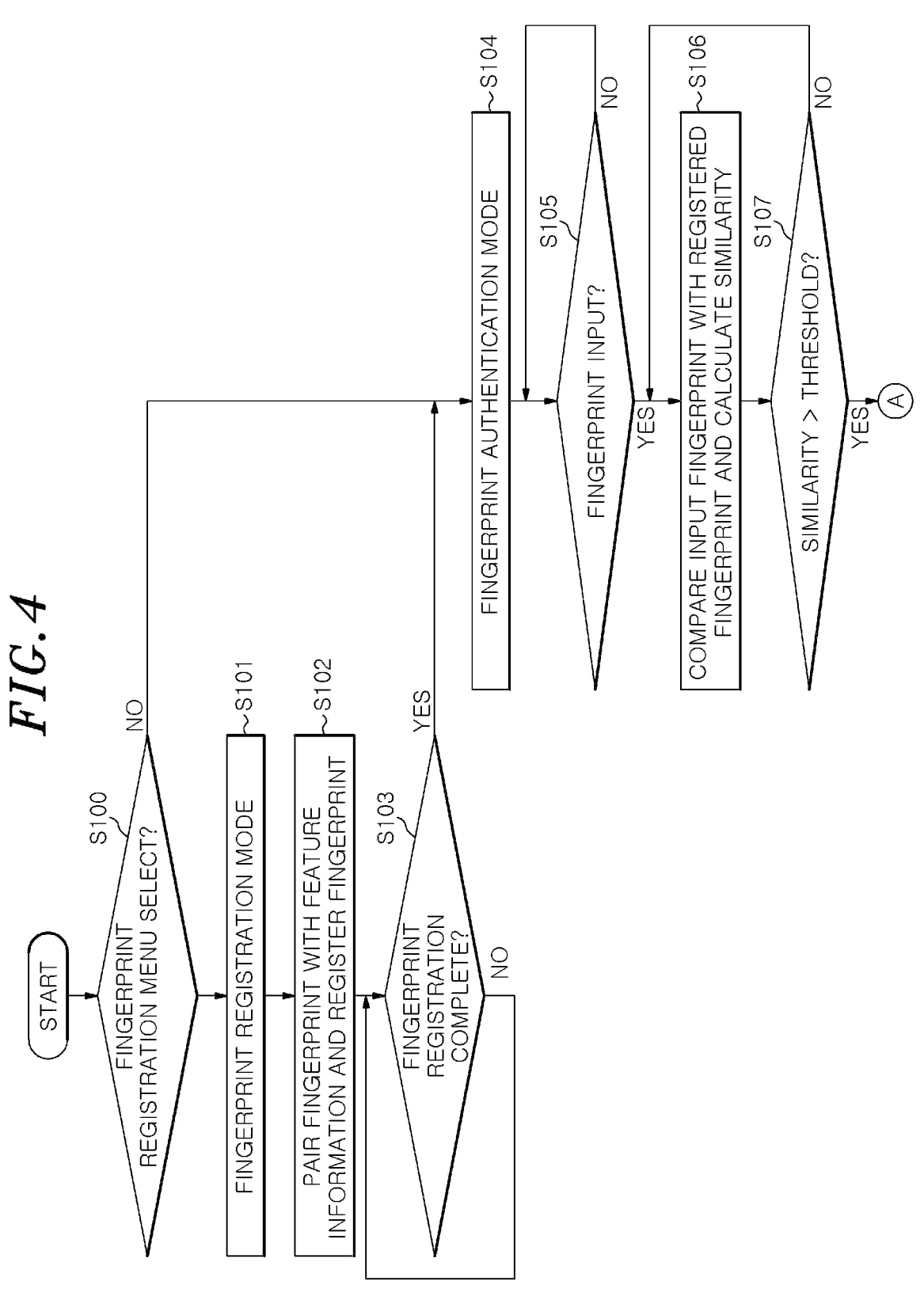
FIG. 4 and FIG. 5 are flowcharts illustrating a fingerprint feature extraction method according to an embodiment of the present disclosure.
Figure 5:
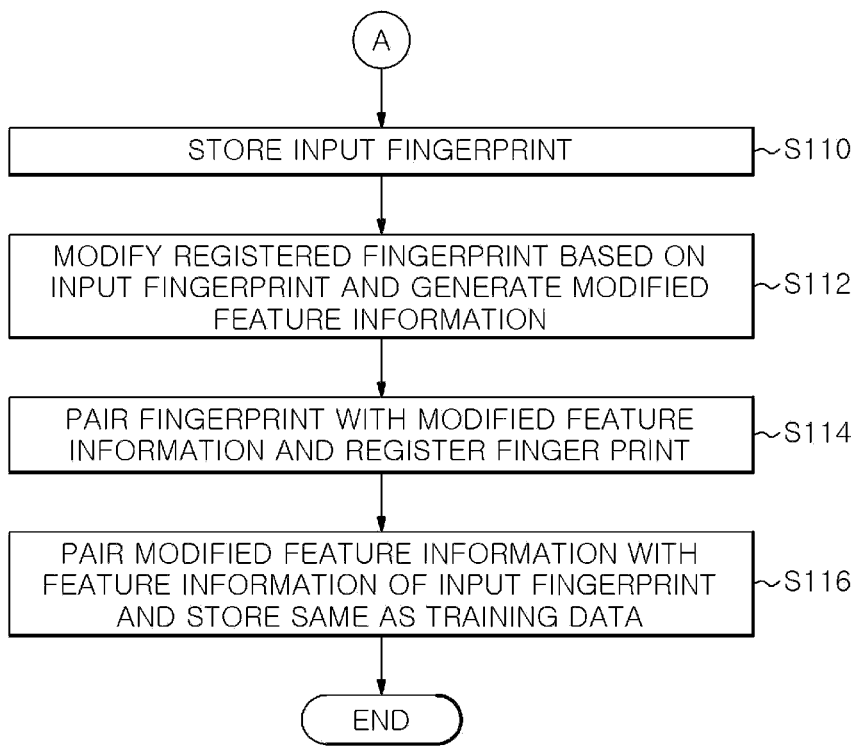

FIG. 4 and FIG. 5 are flowcharts illustrating a fingerprint feature extraction method according to an embodiment of the present disclosure.

As shown in FIG. 4, the fingerprint feature extraction device 100 may operate in a fingerprint registration mode and a fingerprint authentication mode. The fingerprint feature extraction device 100 may provide a fingerprint registration menu, and when the fingerprint registration menu is selected by the user (S100—Yes), the fingerprint feature extraction device 100 may operate in fingerprint registration mode (S101). Additionally, the fingerprint feature extraction device 100 may operate in fingerprint authentication mode (S104), when the fingerprint registration menu is not selected by the user (S100—No) or when the fingerprint registration procedure is completed (S103—Yes).

In the fingerprint registration mode, the fingerprint feature extraction device 100 may receive a fingerprint image through the input unit 110, pair feature information of the fingerprint image with the fingerprint image, and store results of pairing as fingerprint information in the storage 130 (S102).

Thereafter, in the fingerprint authentication mode, when a new fingerprint is input to the input unit 110 of the fingerprint feature extraction device 100 (S105), the processor 120 of the fingerprint feature extraction device 100 may compare the input fingerprint with the registered fingerprint (S106). Specifically, the processor 120 may extract feature information from the input fingerprint and the registered fingerprint, and compare the feature information of the input fingerprint with the feature information of the registered fingerprint.

As a result of the comparison, the processor 120 may determine whether a similarity between the feature information of the input fingerprint and the feature information of the registered fingerprint exceeds a threshold, and if the similarity exceeds the threshold, proceed to step A of FIG. 5 (S107).

As shown in FIG. 5, the processor 120 may store the fingerprint input through the input unit 110 in the storage 130 (S110).

In addition, the processor 120 may modify the registered fingerprint on the basis of the input fingerprint and generate feature information of the registered fingerprint according to the modified result (S112).

Figure 6:
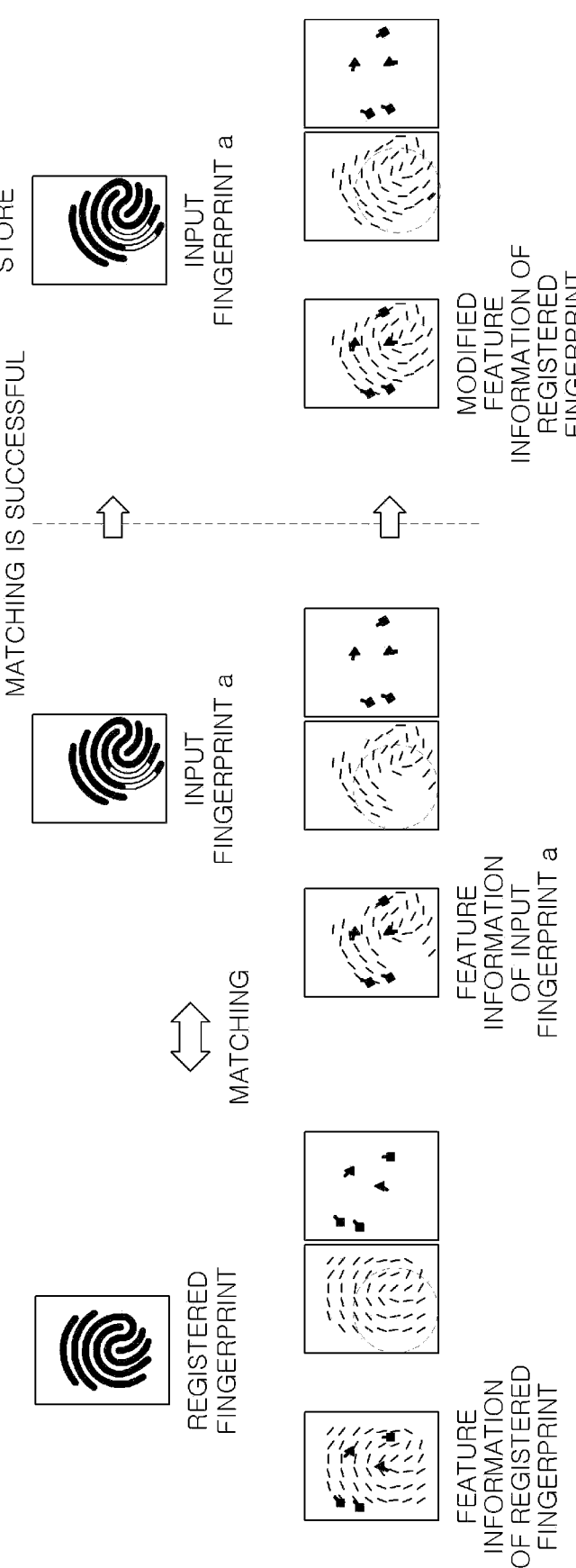
FIG. 6 is a diagram illustrating a fingerprint feature extraction method according to an embodiment of the present disclosure and is a conceptual diagram of an embodiment of storing information on modified features of a registered fingerprint.

FIG. 6 is a diagram illustrating the fingerprint feature extraction method according to an embodiment of the present disclosure, and is a conceptual diagram of an embodiment of generating and storing modified feature information of the registered fingerprint in step S112.

As shown in FIG. 6, a fingerprint image a input through the input unit 110 is subjected to a fingerprint feature extraction step and thus fingerprint feature information is generated, and the fingerprint feature information generated in this manner is subjected to a process of matching with feature information of a previously registered fingerprint.

In the matching process, a matching score (similarity score) indicating the degree of matching between fingerprint feature information is calculated, it is determined whether the calculated matching score exceeds a threshold set by the user, and if the matching score exceeds the threshold, the following process is performed.

First, a modification process is performed to match minutiae between the feature information of the input fingerprint a and the feature information of the registered fingerprint.

This modification process may include, for example, a process of calculating rotation angles and movement distances of the minutiae.

Modified feature information of the registered fingerprint can be generated by rotating and moving the feature information of the registered fingerprint using the rotation angles and movement distances of the minutiae obtained in this process.

As described above, when the modified feature information of the registered fingerprint is generated, the processor 120 can pair the modified feature information with the image of the input fingerprint a and store results of pairing in the learning database 134 of the storage 130 such that the pairing results can be used as training data for the neural network 136 later (S114 and S116).

Figure 8:
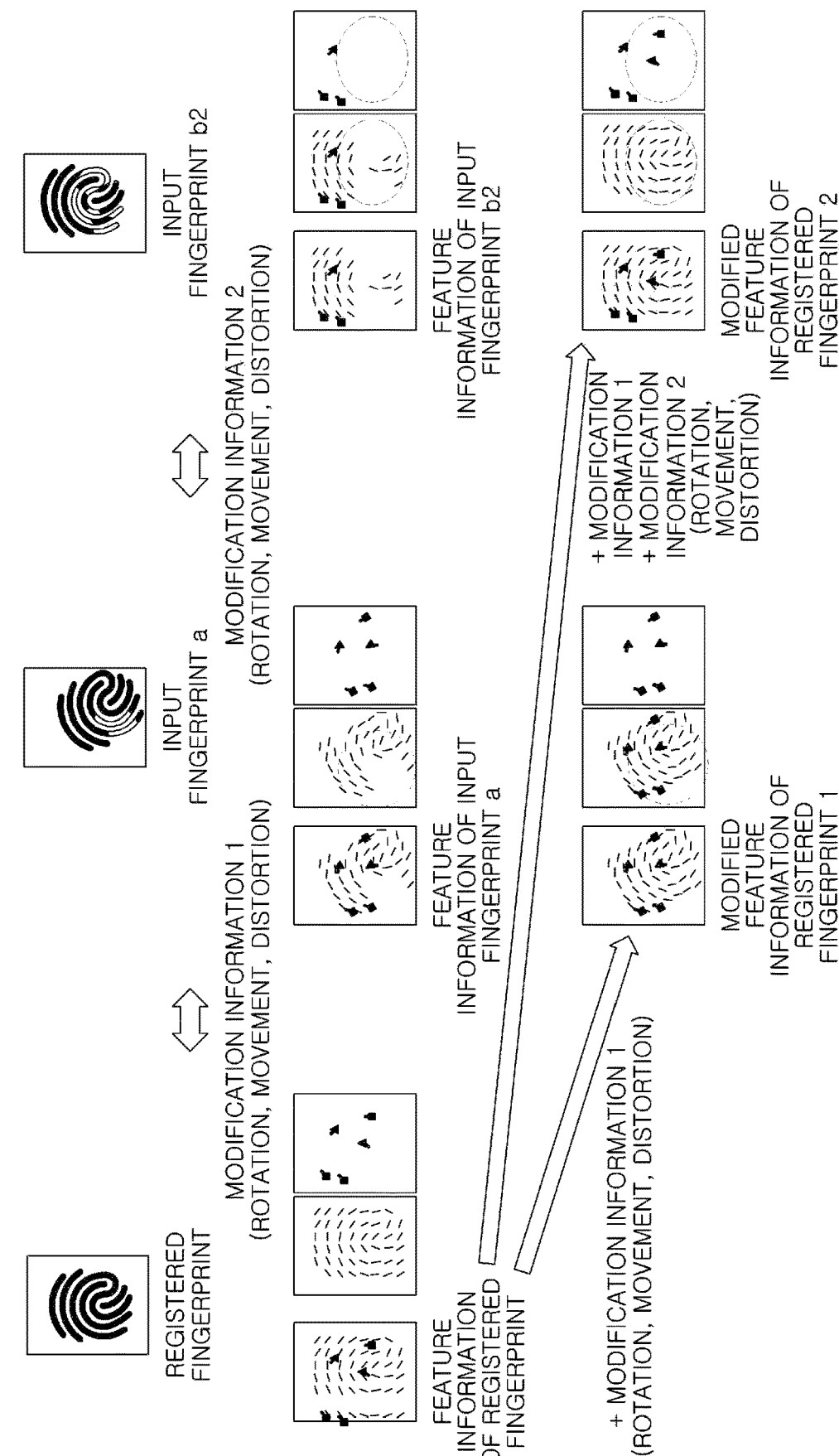

FIG. 7 and FIG. 8 are diagrams illustrating a fingerprint feature extraction method according to an embodiment of the present disclosure and are conceptual diagrams of another embodiment of storing modified feature information of a registered fingerprint.

FIG. 7 and FIG. 8 show a process of storing fingerprint images including input fingerprint images that previously failed in matching when matching is successful after successive matching failures in the fingerprint feature extraction method according to an embodiment of the present disclosure.

First, in the fingerprint feature extraction method using the fingerprint feature extraction device 100 according to another embodiment of the present disclosure, when a fingerprint is input to the fingerprint feature extraction device 100, feature information of the input fingerprint and feature information of a fingerprint registered in the fingerprint feature extraction device 100 are compared primarily, it is determined whether a similarity according to the primary comparison exceeds a first threshold, and if the similarity according to the first comparison exceeds a first threshold, the input fingerprint can be stored as a matching input fingerprint a. For example, on the assumption that the first threshold is 95 and the similarity of the input fingerprint a in FIG. 7 is 98, the input fingerprint a can be initially processed as a successful match.

Thereafter, first modification information for matching matched minutiae between the feature information of the matching input fingerprint a and feature information of the registered fingerprint may be generated, and the feature information of the registered fingerprint may be modified primarily on the basis of the first modification information.

Thereafter, if the similarity according to the primary comparison does not exceed the first threshold, the processor 120 may store the input fingerprint as a non-matching input fingerprint in the storage 130. For example, if the first threshold is 95, the similarity of an input fingerprint b1 is 5, the similarity of an input fingerprint b2 is 85, and the similarity of an input fingerprint b3 is 90 in FIG. 7, and thus the input fingerprints b1 to b3 can initially be processed as a matching failure.

Here, the feature information of any one of the non-matching input fingerprints b1 to b3, for example, the feature information of the non-matching input fingerprint b2, and the feature information of the matching input fingerprint a can be compared secondarily in the embodiment of the present disclosure.

Thereafter, the processor 120 may determine whether a similarity according to the secondary comparison exceeds a second threshold.

If the similarity according to the secondary comparison exceeds the second threshold, the processor 120 may generate second modification information for matching the matched minutiae between the feature information of the non-matching input fingerprint b2 and the feature information of the matching input fingerprint a.

Then, the processor 120 may secondarily modify the feature information of the registered fingerprint on the basis of the second modification information generated in this manner and the first modification information described above.

If the feature information of the registered fingerprint is secondarily modified, the processor 120 may pair the secondarily modified feature information with the non-matching input fingerprint b2.

In this manner, the pairing results can be input to the neural network 136 of the fingerprint feature extraction device 100 and processed such that a fingerprint feature extraction result is output.

Figure 9:
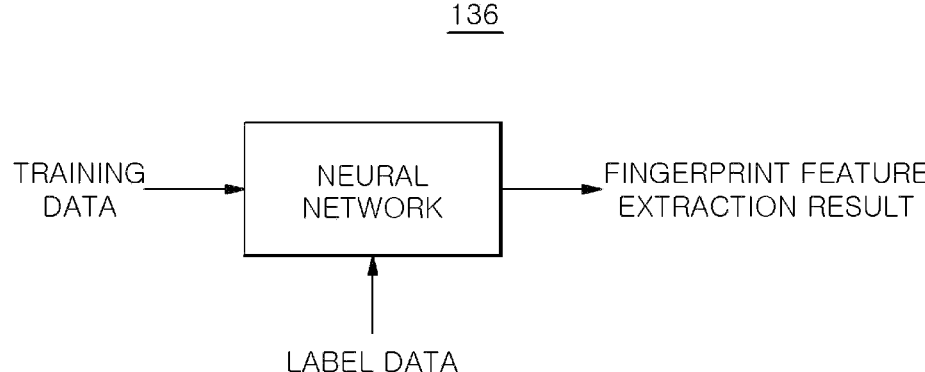
FIG. 9 is a block diagram illustrating a process of training a neural network for fingerprint feature extraction according to an embodiment of the present disclosure.

FIG. 9 is a block diagram illustrating a process of training the neural network 136 for fingerprint feature extraction according to an embodiment of the present disclosure.

In FIG. 9, training data input to the neural network 136 may include results of pairing of modified feature information of a fingerprint registered in the storage 130 of the fingerprint feature extraction device 100 and a fingerprint input through the input unit 110.

Training label data input to the neural network 136 may include, for example, the modified feature information of the registered fingerprint, and the neural network 136 may be a neural network trained to output a feature extraction result with respect to a fingerprint by using pairing results as training data and using the modified feature information of the registered fingerprint as training label data.

The neural network 136 may include, for example, a neural network trained based on deep learning, such as a convolutional neural network (CNN) or a recurrent neural network (RNN).

Figure 10:
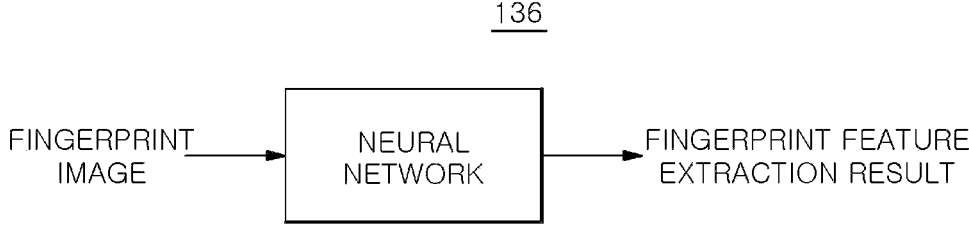
FIG. 10 is a block diagram illustrating a process of extracting fingerprint features using a neural network of the fingerprint feature extraction device according to an embodiment of the present disclosure.

FIG. 10 is a block diagram illustrating a process of extracting fingerprint features using the neural network 136 of the fingerprint feature extraction device 100 according to an embodiment of the present disclosure.

In FIG. 10, data input to the neural network 136 may include a fingerprint image input through the input unit 110 of the fingerprint feature extraction device 100. In addition, the data input to the neural network 136 may include a modified fingerprint image, and the modified fingerprint image may include, for example, a fingerprint image containing noise, a fingerprint image processed to blur, or the like. The degree of modification is not limited.

The neural network 132 may be a neural network pre-trained to output a fingerprint feature extraction result by using results of pairing of modified feature information of a registered fingerprint and an input fingerprint as training data and using the modified feature information of the registered fingerprint as training label data.

Accordingly, when a fingerprint image or a modified fingerprint image is input to the neural network 136, a feature extraction result with respect to the fingerprint can be output through the processor 120.

The neural network 136 may include, for example, a neural network trained based on deep learning, such as a CNN or an RNN, and does not need to be limited to a specific neural network.

According to the embodiments of the present disclosure as described above, it is possible to achieve gradual performance improvement while minimizing resource consumption even if data is damaged by continuously reflecting features of a newly input fingerprint in a previously registered fingerprint, and to gradually improve the performance of a fingerprint recognition algorithm by providing continuity for data learning of a neural network for fingerprint feature extraction. Accordingly, the present disclosure is expected to be able to implement a fingerprint recognition device, an access management system, and the like that can reliably extract original fingerprint features even if a fingerprint state after registration is changed (damaged, missing, or the like).

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:
1. A fingerprint feature extraction device including a fingerprint contact surface, comprising:
   a fingerprint input sensor configured to detect a fingerprint input of a target in contact with the fingerprint contact surface;
   a memory configured to store one or more instructions for outputting a fingerprint feature extraction result with respect to the fingerprint input from the fingerprint input sensor using a pre-trained neural network; and a processor configured to execute the one or more instructions stored in the memory, wherein the instructions, when executed by the processor, cause the processor to:

extract feature information each from the fingerprint input and a registered fingerprint in the fingerprint feature extraction device;

compare the feature information of the fingerprint input with the feature information of the registered fingerprint and calculate a similarity between the feature information of the fingerprint input with the feature information of the registered fingerprint;

determine whether the similarity exceeds a first threshold;

generate modification information to match corresponding minutiae between the feature information of the fingerprint input and the feature information of the registered fingerprint based on whether the similarity exceeds the first threshold;

modify feature information of the registered fingerprint in the fingerprint feature extraction device based on the modification information;

pair the modified feature information of the registered fingerprint with the feature information of the fingerprint input; and input results of pairing to the pre-trained neural network to output the fingerprint feature extraction result.

2. The fingerprint feature extraction device of claim 1, wherein the processor is configured to store the fingerprint input if the similarity exceeds the first threshold.

3. The fingerprint feature extraction device of claim 1, wherein the pre-trained neural network is trained to output the fingerprint feature extraction result by using the results of pairing as training input data and the modified feature information as training label data.

4. The fingerprint feature extraction device of claim 2, wherein the fingerprint input is stored using:

a fingerprint database configured to store image information of the fingerprint input and the feature information of the fingerprint input; or a training database configured to store the results of pairing.

5. The fingerprint feature extraction device of claim 1, wherein the processor is configured to process at least one operation of rotation, movement, or distortion of minutiae of the registered fingerprint.

6. The fingerprint feature extraction device of claim 1, wherein the processor is configured to:

store the fingerprint input as a non-matching fingerprint if the similarity is below the first threshold;

re-compare the feature information of the non-matching fingerprint with the feature information of the registered fingerprint and calculate a resemblance according to the re-comparison between the feature information of the non-matching fingerprint and the feature information of the registered fingerprint;

determine whether the resemblance according to the re-comparison exceeds a second threshold;

generate additional modification information to match corresponding minutiae between the feature information of the non-matching fingerprint and the feature information of the registered fingerprint if the resemblance according to the re-comparison exceeds the second threshold;

re-modify the feature information of the registered fingerprint based on the additional modification information and the modification information;

pair the re-modified feature information of the registered fingerprint with the feature information of the non-matching fingerprint; and input results of pairing of the re-modified feature information of the registered fingerprint with the feature information of the non-matching fingerprint to the pre-trained neural network to output the fingerprint feature extraction result.

7. The fingerprint feature extraction device of claim 6, wherein the processor is configured to train the pre-trained neural network to output the fingerprint feature extraction result by using the results of pairing of the re-modified feature information of the registered fingerprint with the feature information of the non-matching fingerprint as training input data and the re-modified feature information of the registered fingerprint as training label data.

8. A non-transitory computer-readable storage medium storing computer executable instructions, wherein the instructions, when executed by a processor, cause the processor to perform a fingerprint feature extraction method, the method comprising:

preparing a pre-trained neural network;

detecting a fingerprint input of a target input on a fingerprint contact surface included in a fingerprint feature extraction device;

modifying feature information of a registered fingerprint in the fingerprint feature extraction device based on the feature information of the fingerprint input, wherein the modifying includes:

comparing the feature information of the fingerprint input with the feature information of the registered fingerprint and calculating a similarity between the feature information of the fingerprint input with the feature information of the registered fingerprint;

determining whether the similarity exceeds a first threshold;

storing the fingerprint input if the similarity exceeds the first threshold;

generating modification information to match corresponding minutiae between the feature information of the fingerprint input and the feature information of the registered fingerprint; and modifying the feature information of the registered fingerprint based on the modification information;

pairing the modified feature information of the registered fingerprint with the feature information of the fingerprint input; and inputting results of pairing to the pre-trained neural network to output a fingerprint feature extraction result.

9. The non-transitory computer-readable storage medium of claim 8, further comprising training the pre-trained neural network to output the fingerprint feature extraction result by using the results of pairing as training input data and the modified feature information as training label data.

10. The non-transitory computer-readable storage medium of claim 8, wherein the modifying includes processing at least one operation of rotation, movement, or distortion of minutiae of the registered fingerprint.

11. The non-transitory computer-readable storage medium of claim 8, the modifying includes:

storing the fingerprint input as a non-matching fingerprint if the similarity is below the first threshold;

re-comparing the feature information of the non-matching fingerprint with the feature information of the registered fingerprint and calculating a resemblance according to the re-comparison between the feature information of the non-matching fingerprint with the feature information of the registered fingerprint of the non-matching fingerprint and the feature information of the registered fingerprint;

determining whether the resemblance according to the re-comparison exceeds a second threshold;

generating additional modification information to match corresponding minutiae between the feature information of the non-matching fingerprint and the feature information of the registered fingerprint if the resemblance according to the re-comparison exceeds the second threshold;

re-modifying the feature information of the registered fingerprint based on the additional modification information and the modification information;

pairing the re-modified feature information of the registered fingerprint with the feature information of the non-matching fingerprint; and inputting results of pairing of the re-modified feature information of the registered fingerprint with the feature information of the non-matching fingerprint to the pre-trained neural network to output the fingerprint feature extraction result.

12. The non-transitory computer-readable storage medium of claim 11, further comprises training the pre-trained neural network to output the fingerprint feature extraction result by using the results of pairing of the re-modified feature information of the registered fingerprint with the feature information of the non-matching fingerprint as training input data and the re-modified feature information of the registered fingerprint as training label data.

13. A method of training a neural network for fingerprint feature extraction using a fingerprint feature extraction device, the method comprising:

modifying feature information of a registered fingerprint in the fingerprint feature extraction device based on feature information of a fingerprint input of a target by the fingerprint feature extraction device, wherein the modifying comprises:

comparing the feature information of the fingerprint input with the feature information of the registered fingerprint, and calculating a similarity between the feature information of the fingerprint input with the feature information of the registered fingerprint;

determining whether the similarity exceeds a first threshold;

storing the fingerprint input if the similarity exceeds the first threshold;

generating modification information to match corresponding minutiae between the feature information of the fingerprint input and the feature information of the registered fingerprint; and modifying the feature information of the registered fingerprint based on the modification information;

pairing modified feature information of the registered fingerprint with the feature information of the fingerprint input; and training the neural network to output a fingerprint feature extraction result with respect to the fingerprint input by using results of pairing as training input data and the modified feature information as training label data.

14. The method of claim 13, wherein the modifying includes processing at least one operation of rotation, movement, or distortion of minutiae of the registered fingerprint.

15. The method of claim 13, further comprising:

storing the fingerprint input as a non-matching fingerprint if the similarity is below the first threshold;

re-comparing the feature information of the non-matching fingerprint with the feature information of the registered fingerprint and calculating a resemblance according to the re-comparison between the feature information of the non-matching fingerprint with the feature information of the registered fingerprint of the non-matching fingerprint and the feature information of the registered fingerprint;

determining whether the resemblance according to the re-comparison exceeds a second threshold;

generating additional modification information to match corresponding minutiae between the feature information of the non-matching fingerprint and the feature information of the registered fingerprint if the resemblance according to the re-comparison exceeds the second threshold;

re-modifying the feature information of the registered fingerprint based on the additional modification information and the modification information;

pairing the re-modified feature information of the registered fingerprint with the feature information of the non-matching fingerprint; and training the neural network to output the fingerprint feature extraction result with respect to the fingerprint input by using results of pairing of the re-modified feature information of the registered fingerprint with the feature information of the non-matching fingerprint as training input data and the re-modified feature information of the registered fingerprint as training label data.

* * * * *